United States Patent
Wang

(10) Patent No.: US 11,129,157 B2
(45) Date of Patent: Sep. 21, 2021

(54) METHOD FOR DETERMINING WHETHER TO CONTINUE TO DETECT DOWNLINK CONTROL CHANNEL, TERMINAL AND BASE STATION

(71) Applicant: China Academy of Telecommunications Technology, Beijing (CN)

(72) Inventor: Lei Wang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/633,144

(22) PCT Filed: Jul. 25, 2018

(86) PCT No.: PCT/CN2018/097084
§ 371 (c)(1),
(2) Date: Jan. 22, 2020

(87) PCT Pub. No.: WO2019/020060
PCT Pub. Date: Jan. 31, 2019

(65) Prior Publication Data
US 2020/0389871 A1    Dec. 10, 2020

(30) Foreign Application Priority Data
Jul. 26, 2017 (CN) .......................... 201710619715.9

(51) Int. Cl.
*H04W 72/04*   (2009.01)
*H04L 1/00*   (2006.01)

(52) U.S. Cl.
CPC ......... *H04W 72/042* (2013.01); *H04L 1/0038* (2013.01)

(58) Field of Classification Search
CPC .......................... H04W 72/042; H04L 1/0038
See application file for complete search history.

(56) References Cited

U.S. PATENT DOCUMENTS

| | | |
|---|---|---|
| 9,642,159 B1 | 5/2017 | Ramamurthy et al. |
| 2010/0302983 A1 | 12/2010 | McBeath et al. |
| 2012/0082123 A1 | 4/2012 | Kikuchi |

(Continued)

FOREIGN PATENT DOCUMENTS

| | | | |
|---|---|---|---|
| CN | 102347919 A | | 2/2012 |
| CN | WO2016058345 | * | 4/2016 |

(Continued)

*Primary Examiner* — Ronald B Abelson
(74) *Attorney, Agent, or Firm* — Foley & Lardner LLP

(57) ABSTRACT

Provided are a method for determining whether to continue to detect a downlink control channel, a terminal and a base station, for solving the technical problem, for which there is no specific solution in the prior art, of how to determine, after successfully receiving one piece of DCI of a specific DCI format, whether it is still necessary to continue to perform a blind test according to the DCI format. The method for determining whether to continue to detect a downlink control channel comprises: the terminal obtaining first downlink control information (DCI); and the terminal determining, based on the first DCI, whether to continue to detect the downlink control channel.

26 Claims, 5 Drawing Sheets

(56) References Cited

U.S. PATENT DOCUMENTS

| | | |
|---|---|---|
| 2015/0029958 A1* | 1/2015 | Park .................... H04L 5/00 |
| 2016/0014731 A1 | 1/2016 | Li et al. |
| 2016/0128028 A1 | 5/2016 | Mallik et al. |

FOREIGN PATENT DOCUMENTS

| | | |
|---|---|---|
| CN | 105577317 A | 5/2016 |
| EP | 3 121 983 A1 | 1/2017 |
| WO | WO-2017/095470 A1 | 6/2017 |

\* cited by examiner

METHOD FOR DETERMINING WHETHER TO CONTINUE TO DETECT DOWNLINK CONTROL CHANNEL, TERMINAL AND BASE STATION

This application is a National Stage of International Application No. PCT/CN2018/097084, filed Jul. 25, 2018, which claims the priority to Chinese Patent Application No. 201710619715.9 and entitled "METHOD FOR DETERMINING WHETHER TO CONTINUE TO DETECT DOWNLINK CONTROL CHANNEL, TERMINAL AND BASE STATION" filed with the Chinese Patent Office on Jul. 26, 2017, the contents of which are incorporated by reference herein in its entirety.

FIELD

The present disclosure relates to the field of communications, in particular to a method for determining whether to continue to detect a downlink control channel, a terminal and a base station.

BACKGROUND

The mobile internet is subverting a traditional mobile communication service mode, providing unparalleled usage experience for a user and deeply affecting all aspects of work and life of people. The mobile internet will promote further upgrade of an information interaction manner in a human society and provide augmented reality, virtual reality, ultra-high-definition (3D) videos, mobile cloud and other more abundant service experience for the user. Further development of the mobile internet will bring the growth of mobile traffic for thousands of times in the future, thereby boosting a new round reform of mobile communication technologies and industries. The internet of things extends a service scope of mobile communications, from person-to-person communication to person-to-object and object-to-object smart interconnecting, enabling mobile communication technologies to be penetrated into industries and fields in a broader range. In the future, mobile health, internet of vehicles, smart home, industrial control, environmental monitoring and the like will boost the explosive growth of the application of the internet of things, and one hundred billion devices will access the network, thereby realizing the true "internet of everything". Meanwhile, the connection of massive devices and various services of the internet of things also bring new technological challenges for mobile communications.

With the continuous appearance and abundance of new service requirements, higher performance requirements are proposed for a future mobile communication system, e.g. higher peak rate, better user experience rate, smaller latency, higher reliability, higher spectrum efficiency and higher energy consumption efficiency etc., and it is necessary to support more users to access and use various service types. A terminal is possibly required to simultaneously support a plurality of transmission modes, a plurality of scenes and more diversified service types. Complexity and energy consumption requirements at a terminal side also become stricter. If the terminal is required to monitor a downlink control channel on an entire transmission bandwidth, the control over energy consumption of the terminal can bring a great challenge and increase latency at the terminal side. In the other aspect, increment of requirements on utilization ratio of resources and requirements for some application scenes in the future, e.g. inter-cell interference coordination (ICIC), are required to configure transmission resources of the downlink control channel more flexibly.

In a long term evolution (LTE) system, the terminal monitors the downlink control channel within a common search space and/or a UE-specific search space according to a downlink control information format (DCI format) desired to be received. After receiving the DCI format desired to be received, the terminal does not continue to perform a blind detection on DCI of the DCI format desired to be received. In a future radio mobile communication system, in order to increase the reliability of transmission and the coverage scope of a base station etc., it is necessary to introduce beam-based transmission. In a scene where reliability needs to be enhanced, the base station needs to transmit a DCI format carrying same information on different beams; when it is necessary to schedule one terminal to receive or transmit two independent service channels, the base station needs to transmit the same DCI format carrying different schedule information on different beams. For a terminal supporting the above two service scenes, there is no definite solution in the prior art on how to determine whether it is still necessary to perform a blind detection according to a DCI format after one DCI with a specified DCI format is successfully received.

SUMMARY

An embodiment of the present disclosure provides a method for determining whether to continue to detect a downlink control channel so as to solve the technical problem, for which there is no specific solution in the related art, of how to determine whether it is still necessary to continue to perform a blind detection according to a DCI format after one DCI with a specific DCI format is successfully received.

In a first aspect.

An embodiment of the present disclosure provides a method for determining whether to continue to detect a downlink control channel, which is applied to a terminal and includes: acquiring, by the terminal, first DCI; and determining, by the terminal, whether to continue to detect the downlink control channel based on the first DCI.

Optionally, if the terminal acquires the first DCI from a common downlink control channel or a group common downlink control channel, determining, by the terminal, whether to continue to detect the downlink control channel based on the first DCI includes: determining, by the terminal, first blind detection indication information corresponding to the terminal among at least one blind detection indication information carried in the first DCI, where the first blind detection indication information is used for indicating the number of DCI to be received by the terminal based on a first preset DCI format within a UE-specific search space in one monitoring occasion; and after one DCI is successfully received by the terminal according to the first preset DCI format within the UE-specific search space in one monitoring occasion, determining, by the terminal, whether to continue to detect the downlink control channel according to the first preset DCI format in the same monitoring occasion based on the first blind detection indication information.

Optionally, if the terminal acquires the first DCI from a UE-specific downlink control channel, determining, by the terminal, whether to continue to detect the downlink control channel based on the first DCI includes: determining, by the terminal, second blind detection indication information carried in the first DCI, where the second blind detection indication information is used for indicating the number of DCI with the same DCI format as the first DCI to be received by the terminal in the same monitoring occasion of the downlink control channel; and determining, by the terminal, whether to continue to detect the downlink control channel according to DCI with the same DCI format as the first DCI in the same monitoring occasion based on the second blind detection indication information.

Optionally, the first blind detection indication information or the second blind detection indication information is indicated by an N-bit information domain, where N is an integer greater than or equal to 1; and determining, by the terminal, whether to continue to detect the downlink control channel based on the first blind detection indication information or the second blind detection indication information, includes: when the first blind detection indication information or the second blind detection indication information is in a first status, determining, by the terminal, not to continue to detect the downlink control channel, where the first status is a status when the number of DCI with the same DCI format to be received by the terminal in one monitoring occasion is 1; or when the first blind detection indication information or the second blind detection indication information is in a second status, determining, by the terminal, to continue to detect the downlink control channel, where the second status is a status when the number of DCI with the same DCI format to be received by the terminal in one monitoring occasion is greater than 1.

Optionally, the N-bit information domain serves as a first information domain or a second information domain or a third information domain of the first DCI.

Optionally, the monitoring occasion is a continuous time-domain resource of a downlink control channel to be monitored by the terminal in a transmission time interval (TTI), and the terminal is required to monitor the downlink control channel in at least one control resource set (CORESET) in the monitoring occasion.

Optionally, determining, by the terminal, whether to continue to detect the downlink control channel according to the same DCI format in the same monitoring occasion based on the first DCI, and the method includes: determining, by the terminal, a first RNTI used for scrambling a cyclic redundancy check (CRC) of the first DCI; and determining, by the terminal, whether to continue to detect the downlink control channel based on the first RNTI.

Optionally, determining, by the terminal, whether to continue to detect the downlink control channel based on the first RNTI, includes: when the terminal determines that the first RNTI is an RNTI with a first number, determining, by the terminal, not to continue to detect the downlink control channel, or when the terminal determines that the first RNTI is an RNTI with a second number, determining, by the terminal, to continue to detect the downlink control channel.

Optionally, determining, by the terminal, whether to continue to detect the downlink control channel according to the same DCI format in the same monitoring occasion based on the first DCI, includes: determining, by the terminal, a DCI format of the first DCI; and determining, by the terminal, whether to continue to detect the downlink control channel based on a DCI format set to which the DCI format of the first DCI belongs.

In a second aspect.

An embodiment of the present disclosure provides a method for determining whether to continue to detect a downlink control channel, which is applied to a terminal and includes: determining, by the terminal, the number of DCI with a second preset DCI format to be received in each monitoring occasion based on third blind detection indication information carried in higher layer signaling; and judging, by the terminal, whether to continue to detect the downlink control channel in the same monitoring occasion according to the second preset DCI format after one DCI with the second preset DCI format is successfully received.

Optionally, the third blind detection indication information is indicated by an M-bit information domain, where M is an integer greater than or equal to 1; and after one DCI with the second preset DCI format is successfully received, judging, by the terminal, whether to continue to detect the downlink control channel in the same monitoring occasion according to the first preset DCI format includes: when the third blind detection indication information is in a third status, determining, by the terminal, not to continue to detect the downlink control channel, where the third status is a status when the number of DCI with the same DCI format to be received by the terminal in one monitoring occasion is 1, or when the third blind detection indication information is in a fourth status, determining, by the terminal, to continue to detect the downlink control channel, where the fourth status is a status when the number of DCI with the same DCI format to be received by the terminal in one monitoring occasion is greater than 1.

In a third aspect.

An embodiment of the present disclosure provides a method for determining whether to continue to detect a downlink control channel, which is applied to a base station and includes: transmitting, by the base station, first DCI to a terminal to cause the terminal to determine whether to continue to detect the downlink control channel based on the first DCI after acquiring the first DCI.

Optionally, if the base station transmits the first DCI to the terminal through a common downlink control channel or a group common downlink control channel, at least one blind detection indication information is carried in the first DCI, each of the at least one blind detection indication information is used for indicating the number of DCI with a preset DCI format of a corresponding terminal to be received within a UE-specific search space in one monitoring occasion.

Optionally, if the base station transmits the first DCI to the terminal through a UE-specific downlink control channel, second blind detection indication information is carried in the first DCI, and the second blind detection indication information is used for indicating the number of DCI with the same DCI format as the first DCI to be received by the terminal in the same monitoring occasion of the downlink control channel.

Optionally, before the base station transmits the first DCI to the terminal, the method includes: carrying, by the base station, each of the at least one blind detection indication information or the second blind detection indication information in an N-bit information domain of the first DCI; where N is an integer greater than or equal to 1, each of the at least one blind detection indication information or the second blind detection indication information includes a first status and a second status, where the first status is a status indicated by the base station when the number of DCI with the same DCI format to be received by the terminal in one monitoring occasion is 1, and the second status is a status indicated by the base station when the number of DCI with the same DCI format to be received by the terminal in one monitoring occasion is greater than 1.

Optionally, the N-bit information domain serves as a first information domain or a second information domain or a third information domain of the first DCI.

Optionally, the monitoring occasion is a continuous time-domain resource of a downlink control channel to be monitored by the terminal in a TTI.

Optionally, before the base station transmits the first DCI to the terminal, the method further includes: scrambling, by the base station, a cyclic redundancy check (CRC) of first DCI based on a first RNTI, where the first RNTI is an RNTI with a first number or an RNTI with a second number; and when the first RNTI is an RNTI with a first number, enabling the base station to indicate the terminal not to continue to detect a downlink control channel, or when the first RNTI is a RNTI having a second number, enabling the base station to indicate the terminal to continue to detect a downlink control channel.

Optionally, before the base station transmits the first DCI to the terminal, the method includes: transmitting, by the base station, first DCI for a terminal by using different DCI formats which belong to different DCI format sets, where each of the DCI format sets corresponds to whether the terminal continues to detect the downlink control channel or the terminal does not continue to detect the downlink control channel.

In a fourth aspect.

An embodiment of the present disclosure provides a method for determining whether to continue to detect a downlink control channel, which is applied to a base station and includes: transmitting, by the base station, higher layer signaling to the terminal, where the higher layer signaling includes third blind detection indication information, the third blind detection indication information indicates the number of DCI with a second preset DCI format to be received by the terminal in each monitoring occasion.

Optionally, before the base station transmits the higher layer signaling to the terminal, the method includes: carrying, by the base station, the third blind detection indication information in an M-bit information domain of the higher layer signaling; where M is an integer greater than or equal to 1, the third blind detection indication information includes a third status and a fourth status, the third status is a status when the number of DCI with the same DCI format to be received by the terminal in one monitoring occasion is 1, and the fourth status is a status when the number of DCI with the same DCI format to be received by the terminal in one monitoring occasion is greater than 1.

In a fifth aspect.

An embodiment of the present disclosure provides a terminal, and the terminal includes: an acquiring module for acquiring first DCI; and a first determining module for determining whether to continue to detect a downlink control channel based on the first DCI.

Optionally, if the acquiring module acquires the first DCI from a common downlink control channel or a group common downlink control channel, the first determining module is used for: determining first blind detection indication information corresponding to the terminal among at least one blind detection indication information carried in the first DCI, where the first blind detection indication information indicates the number of DCI to be received by the terminal based on a second preset DCI format within a UE-specific search space in one monitoring occasion; and determining whether to continue to detect the downlink control channel according to the second preset DCI format in the same monitoring occasion based on the first blind detection indication information after one DCI is successfully received according to the second preset DCI format within a UE-specific search space in one monitoring occasion.

Optionally, if the acquiring module acquires the first DCI from a UE-specific downlink control channel, the first determining module is used for: determining second blind detection indication information carried in the first DCI, where the second blind detection indication information is used for indicating the number of DCI with the same DCI format as the first DCI to be received by the terminal in the same monitoring occasion of the downlink control channel; and determining whether to continue to detect the downlink control channel according to DCI with the same DCI format as the first DCI in the same monitoring occasion based on the second blind detection indication information.

Optionally, the first blind detection indication information or the second blind detection indication information is indicated by an N-bit information domain, where N is an integer greater than or equal to 1; and the first determining module is used for: when the first blind detection indication information or the second blind detection indication information is in a first status, determining not to continue to detect the downlink control channel, where the first status is a status when the number of DCI with the same DCI format to be received by the terminal in one monitoring occasion is 1; or when the first blind detection indication information or the second blind detection indication information is in a second status, determining to continue to detect the downlink control channel to acquire second DCI, where the second status is a status when the number of DCI with the same DCI format to be received by the terminal in one monitoring occasion is greater than 1.

Optionally, the N-bit information domain serves as a first information domain or a second information domain or a third information domain of the first DCI.

Optionally, the monitoring occasion is a continuous time-domain resource of a downlink control channel to be monitored by the terminal, and the terminal is required to monitor the downlink control channel in at least one control resource set (CORESET) in the monitoring occasion.

Optionally, the first determining module is used for: determining a first RNTI used for scrambling a cyclic redundancy check (CRC) of the first DCI; and determining whether to continue to detect the downlink control channel according to the same DCI format in the same monitoring occasion based on the first RNTI.

Optionally, the first determining module is specifically used for: if it is determined that the first RNTI is an RNTI with a first number, determining not to continue to detect the downlink control channel according to the same DCI format in the same monitoring occasion; or if it is determined that the first RNTI is an RNTI with a second number, determining to continue to detect the downlink control channel according to the same DCI format in the same monitoring occasion to acquire second DCI.

Optionally, the first determining module is used for: determining a DCI format of the first DCI; and determining whether to continue to detect the downlink control channel according to the same DCI format in the same monitoring occasion based on a DCI format set to which the DCI format of the first DCI belongs.

In a sixth aspect.

An embodiment of the present disclosure provides a terminal, and the terminal includes: a second determining module for determining the number of DCI with a second preset DCI format to be received in each monitoring occasion based on third blind detection indication information carried in higher layer signaling; and a judging module for judging whether to continue to detect a downlink control channel in the same monitoring occasion according to the second preset DCI format after one DCI with the second preset DCI format is successfully received.

Optionally, the third blind detection indication information is indicated by an M-bit information domain, where M is an integer greater than or equal to 1; and the second determining module is used for: when the third blind detection indication information is in a third status, determining not to continue to detect the downlink control channel, where the third status is a status when the number with the same DCI format to be received by the terminal in one monitoring occasion is 1, or when the third blind detection indication information is in a fourth status, determining to continue to detect the downlink control channel, where the fourth status is a status when the number of DCI with the same DCI format to be received by the terminal in one monitoring occasion is greater than 1.

In a seventh aspect.

An embodiment of the present disclosure provides a base station, and the base station includes: a first transmitting module for transmitting first DCI to a terminal to cause the terminal to determine whether to continue to detect a downlink control channel based on the first DCI after acquiring the first DCI.

Optionally, if the first transmitting module transmits the first DCI to the terminal through a common downlink control channel or a group common downlink control channel, at least one blind detection indication information is carried in the first DCI, where each of the at least one blind detection indication information is used for indicating the number of DCI with a preset DCI format of a corresponding terminal to be received within a UE-specific search space in one monitoring occasion.

Optionally, if the first transmitting module transmits the first DCI to the terminal through a UE-specific downlink control channel, second blind detection indication information is carried in the first DCI, and the second blind detection indication information is used for indicating the number of DCI with the same DCI format as the first DCI to be received by the terminal in the same monitoring occasion of the downlink control channel.

Optionally, the base station further includes: an indicating module for indicating each of the at least one blind detection indication information or the second blind detection indication information through an N bit information domain, where N is an integer greater than or equal to 1; and based on an N-bit information domain, determining a first status and a second status of each of the at least one blind detection indication information or the second blind detection indication information, where the first status is a status indicated by the base station when the number of DCI with the same DCI format to be received by the terminal in one monitoring occasion is 1, and the second status is a status indicated by the base station when the number of DCI with the same DCI format to be received by the terminal in one monitoring occasion is greater than 1.

Optionally, the N-bit information domain serves as a first information domain or a second information domain or a third information domain of the first DCI.

Optionally, the monitoring occasion is a continuous time-domain resource of a downlink control channel to be monitored by the terminal.

Optionally, the base station further includes: a scrambling module for scrambling a cyclic redundancy check (CRC) of first DCI based on a first RNTI, where the first RNTI is an RNTI with a first number or an RNTI with a second number; and when the first RNTI is an RNTI with a first number, indicating the terminal not to continue to detect the downlink control channel, or when the first RNTI is an RNTI with a second number, indicating the terminal to continue to detect the downlink control channel.

Optionally, the base station further includes: a configuring module for transmitting first DCI for a terminal by using a DCI format which belongs to a different DCI format set, where each DCI format set corresponds to whether the terminal continues to detect the downlink control channel or the terminal does not continue to detect the downlink control channel.

In an eighth aspect.

An embodiment of the present disclosure provides a base station, including: a second transmitting module for transmitting higher layer signaling to the terminal, where the higher layer signaling includes third blind detection indication information, the third blind detection indication information is used for indicating the number of DCI with a second preset DCI format to be received by the terminal in each monitoring occasion.

Optionally, the base station further includes: a processing module for carrying third blind detection indication information in an M-bit information domain of the higher layer signaling before the higher layer signaling is transmitted to the terminal; where M is an integer greater than or equal to 1, the third blind detection indication information includes a third status and a fourth status, the third status is a status when the number of DCI with the same DCI format to be received by the terminal in one monitoring occasion is 1, and the fourth status is a status when the number of DCI with the same DCI format to be received by the terminal in one monitoring occasion is greater than 1.

In a ninth aspect.

An embodiment of the present disclosure provides a computer device, and the computer device includes a processor, where the processor is used for realizing the above method when computer programs stored in a memory is performed.

In a tenth aspect.

An embodiment of the present disclosure provides a computer readable storage medium, the computer readable storage medium stores computer instructions that, when operating on a computer, causes the computer to perform the above method.

One or more technical solutions among the above technical solutions have the following technical effects or advantages.

First, an embodiment of the present disclosure provides a method for determining whether to continue to detect a downlink control channel, including: acquiring, by the terminal, first DCI; and determining, by the terminal, whether to continue to detect the downlink control channel based on the first DCI. That is, in the embodiment of the present disclosure, the terminal can automatically determine whether to continue to detect the downlink control channel according to the acquired first DCI, thus reducing times that the terminal performs the blind detection on the downlink control channel as well as the energy consumption and complexity of the terminal.

Second, if the terminal acquires the first DCI from a common downlink control channel or a group common downlink control channel, the terminal can determine first blind detection indication information corresponding to the terminal among at least one blind detection indication information carried in the first DCI, and then, the terminal can determine whether to continue to detect the downlink control channel according to the first blind detection indication information. That is, the first DCI acquired by the terminal includes at least one blind detection indication information, the terminal can parse first blind detection indication information corresponding to the terminal and then, detects and receives DCI with a DCI format corresponding to the parsed blind detection indication information according to the first blind detection indication information; i.e. the terminal can determine the number of DCI with a required DCI format according to the parsed blind detection indication information before performing the blind detection of the DCI.

Third, if the terminal acquires the first DCI from a UE-specific downlink control channel, the terminal determines second blind detection indication information carried in the first DCI, where the second blind detection indication information is used for indicating the number of DCI with the same DCI format as the first DCI to be received by the terminal in the same monitoring occasion of the downlink control channel, and further, the terminal determines whether to continue to detect the downlink control channel according to DCI with the same DCI format as the first DCI in the same monitoring occasion according to the second blind detection indication information, thereby reducing times that the terminal performs the blind detection on the downlink control channel by.

Fourth, an embodiment of the present disclosure further provides a method for determining whether to continue to detect a downlink control channel. In the method, the terminal determines the number of DCI with a second preset DCI format to be received in each monitoring occasion based on third blind detection indication information carried in higher layer signaling; and the terminal judges whether to continue to detect the downlink control channel in the same monitoring occasion according to the second preset DCI format after one DCI with the second preset DCI format is successfully received. That is, the terminal can directly acquire third blind detection indication information from the higher layer signaling, and then, can determine the number of DCI with a second preset DCI format to be received before performing a blind detection of the downlink control channel; and the subsequent terminal can detect and receive the DCI in the downlink control channel according to the number of the DCI so as to solve the technical problem that the terminal does not continue to receive the DCI with the DCI format after one DCI is received according to a specified DCI format in the prior art, thereby improving the accuracy of the terminal in acquiring the DCI.

BRIEF DESCRIPTION OF THE DRAWINGS

In order to describe technical solutions in embodiments of the present disclosure more clearly, accompanying drawings required for use in description of the embodiments of the present disclosure will be described below briefly. Obviously, the accompanying figures described below are merely some embodiments of the present disclosure. Under the precondition of not paying creative labor, the ordinary skilled in the art can also acquire other accompanying drawings according to these accompanying figures described below.

DETAILED DESCRIPTION OF THE EMBODIMENTS

In order to enable the purposes, technical solutions and advantages of the embodiments of the present disclosure to be clearer, the accompanying drawings in embodiments of the present disclosure will be incorporated below to describe the technical solutions in embodiments of the present disclosure completely and clearly.

Firstly, a part of terms in the embodiments of the present disclosure is introduced briefly to facilitate understanding of those skilled in the art.

A physical downlink control channel (PDCCH) may be used to carry scheduling information and other control information. There may be a plurality of PDCCHs in a control region of each downlink sub-frame. The size of the control region is decided by a physical control format indicator channel (PCFICH), and the control region occupies 1 to 4 orthogonal frequency division multiplexing (OFDM) symbols. The transmission of one control channel occupies one control channel element (CCE) or a plurality of consecutive CCEs, and each of the CCEs includes nine resource element groups (REGs). Moreover, REGs included in the CCEs of the downlink control channel are REGs that are not used for carrying the PCFICH and a physical hybrid ARQ indicator channel (PHICH). The downlink control channel may support a plurality of DCI formats to adapt to different requirements. When a base station distributes resources for a downlink control channel, it is necessary to avoid a conflict among different downlink control channels, i.e. when a certain CCE or a plurality of CCEs have already been occupied by a downlink control channel, the CCE(s) is(are) not distributed to another downlink control channel.

In a future radio mobile communication system, in order to increase the reliability of transmission and the coverage scope of a base station etc., a base station needs to transmit a DCI format carrying same information to a terminal on different beams or a base station needs to transmit the same DCI format carrying different schedule information to a terminal on different beams. The terminal may detect and receive DCI according to a DCI format required by the terminal.

The accompanying drawings are incorporated below to describe preferred embodiments of the present disclosure in details.

Embodiment 1

Figure 1:
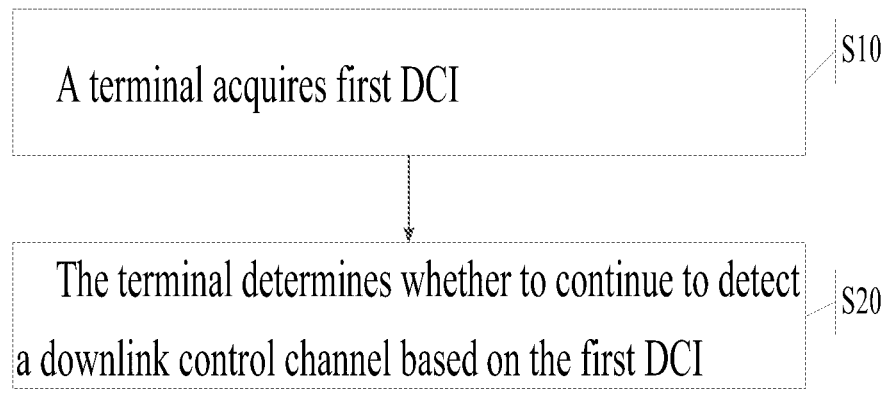
FIG. 1 is a schematic flow diagram showing a method for determining whether to continue to detect a downlink control channel provided in embodiment 1 in embodiments of the present disclosure.

Referring to FIG. 1, an embodiment of the present disclosure provides a method for determining whether to continue to detect a downlink control channel, which may be applied to a terminal. The processes of the method may be described as follows.

S10: the terminal acquires first DCI.

S20: the terminal determines whether to continue to detect the downlink control channel based on the first DCI.

In S10, the terminal acquires the first DCI from a base station, where the first DCI is carried by the downlink control channel, and the DCI includes uplink and downlink resource distribution, hybrid automatic repeat request (HARQ), power control and other information.

Optionally, the terminal acquires the first DCI from the base station through, but not limited to the following two manners.

Manner 1: the terminal acquires the first DCI from a common PDCCH or a group common PDCCH.

In manner 1, the first DCI includes at least one blind detection indication information, where each blind detection indication information corresponds to the number of DCI with a DCI format required by the terminal.

In some embodiments, when the first DCI includes blind detection indication information 1 and blind detection indication information 2, the blind detection indication information 1 may indicate that the number of DCI with DCI format 1 corresponding to terminal A is 2; and the blind detection indication information 2 may indicate that the number of DCI with DCI format 2 corresponding to terminal B is 1.

Therefore, after acquiring the first DCI from the common downlink control channel or the group common downlink control channel, the terminal may determine first blind detection indication information corresponding to the terminal among at least one blind detection indication information carried in the first DCI, and then, the terminal determines whether to continue to detect the downlink control channel according to the first preset DCI format in the same monitoring occasion based on the first blind detection indication information after one DCI is successfully received according to the first preset DCI format within a UE-specific search space in one monitoring occasion.

Optionally, the monitoring occasion is a continuous time-domain resource of a downlink control channel to be monitored by the terminal in a transmission time interval (TTI), and the terminal is required to monitor the downlink control channel in at least one control resource set (CORESET) in the monitoring occasion.

In some embodiments, after receiving the first DCI, terminal A may parse blind detection indication information 1 corresponding to terminal A from at least one blind detection indication information according to an index of an indication information domain that is transmitted by a base station through radio resource control (RRC) signaling and corresponds to terminal A. Then, terminal A may, according to the indication of blind detection indication information 1, determine requirements of detecting and receiving two DCI in the downlink control channel according to a first preset DCI format, i.e., DCI format 1, within a UE-specific search space in one monitoring occasion. That is, if terminal A successfully receives DCI with DCI format 1, terminal A is also required to continue to detect the downlink control channel according to the same DCI format 1 in the same monitoring occasion.

Manner 2: the terminal acquires the first DCI from a UE-specific downlink control channel.

In manner 2, second blind detection indication information may be carried in the first DCI acquired by the terminal, and the second blind detection indication information may be used for indicating the number of DCI with the same DCI format as the first DCI to be received by the terminal in the same monitoring occasion of the downlink control channel.

That is, the number of DCI indicated by the second blind detection indication information may be the number of DCI including the first DCI acquired by the terminal. Moreover, the DCI has the same DCI format.

In some embodiments, if the number of DCI indicated by the second blind detection indication information is 3, since the terminal has received the first DCI within a UE-specific search space in one monitoring occasion, the terminal is also required to detect and receive two DCI with the same DCI format as the first DCI in the same monitoring occasion; or if the number of DCI indicated by the second blind detection indication information is 1, since the terminal has received the first DCI within a UE-specific search space in one monitoring occasion, the terminal is no longer required to detect and receive the DCI with the same DCI format as the first DCI in the same monitoring occasion.

Optionally, the blind detection indication information may be indicated by an N-bit information domain, where N is an integer greater than or equal to 1, and the N-bit information domain may serve as a first information domain or a second information domain or a third information domain of the first DCI. The blind detection indication information may be divided into, but not limited to the following two statuses according to the N-bit information domain.

A first status may be described as a status when the number of DCI with the same DCI format to be received by the terminal in one monitoring occasion is 1.

In some embodiments, if the blind detection indication information is indicated by a 1-bit information domain, e.g., the blind detection indication information may be 0, that is, the blind detection indication information is in the first status, the number of DCI with the same DCI format to be received by the terminal in one monitoring occasion is 1; if the blind detection indication information is indicated by an N-bit (N>1) information domain, e.g., the blind detection indication information is indicated by an 2-bit information domain, the combination of the blind detection indication information may be 00, that is, the blind detection indication information is in the first status, the number of DCI with the same DCI format to be received by the terminal in one monitoring occasion is 1.

A second status may be described as a status when the number of DCI with the same DCI format to be received by the terminal in one monitoring occasion is greater than 1.

In some embodiments, if the blind detection indication information is indicated by a 1-bit information domain, e.g., the blind detection indication information may be 1, that is, the blind detection indication information is in the second status, the number of DCI with the same DCI format to be received by the terminal in one monitoring occasion is greater than 1; if the blind detection indication information is indicated by an N-bit (N>1) information domain, e. g., the blind detection indication information is indicated by an 2-bit information domain, the combination of the blind detection indication information may be 01 or 10 or 11, that is, the blind detection indication information is in the second status, the number of DCI with the same DCI format to be received by the terminal in one monitoring occasion is greater than 1.

Optionally, in view of manner 1, when the first blind detection indication information corresponding to the terminal among at least one blind detection indication information carried in the first DCI determined by the terminal is in the first status, that is, the first blind detection indication information indicates that the number of DCI with the same DCI format to be received by the terminal in one monitoring occasion is 1, the terminal does not continue to detect the downlink control channel after one DCI with the same DCI format is received in one monitoring occasion.

When the first blind detection indication information corresponding to the terminal among at least one blind detection indication information carried in the first DCI determined by the terminal is in the second status, that is, the first blind detection indication information indicates that the number of DCI with the same DCI format to be received by the terminal in one monitoring occasion is greater than 1, the terminal is required to continue to detect and receive the downlink control channel in one CORESET or other CORESETs in the same monitoring occasion according to the same DCI format after one DCI with the same DCI format is received in one monitoring occasion until two or three or four DCI or the like with the same DCI format are detected and received in the downlink control channel.

In view of manner 2, when the second blind detection indication information carried in the first DCI acquired by the terminal is in the first status, that is, the second blind detection indication information indicates that the number of DCI with the same DCI format to be received by the terminal in one monitoring occasion is 1, since the terminal has received the first DCI at this time, the terminal does not continue to detect a downlink control channel in the CORESET or other CORESETs according to the DCI format of the first DCI after the first DCI carried in the downlink control channel is successfully detected and received in one CORESET in one monitoring occasion of the downlink control channel.

When the second blind detection indication information carried in the first DCI acquired by the terminal is in the second status, that is, the second blind detection indication information indicates that the number of DCI with the same DCI format to be received by the terminal in one monitoring occasion is greater than 1, since the terminal has received the first DCI only at this time, the terminal is required to continue to detect the downlink control channel in the CORESET or other CORESETs according to the DCI format of the first DCI after the first DCI carried by the downlink control channel is successfully detected and received in one CORESET in one monitoring occasion of the downlink control channel.

In the embodiments of the present disclosure, in order to improve coverage against attenuation of a high-frequency band, the base station is possibly required to transmit the downlink control channel by using a directional beam. In different application scenes, such as to increase the reliability, the base station may transmit the same data information on different beams, or the base station may also transmit different data information on different beams, for example, the base may simultaneously transmit different downlink data on different beams from the same or different transmission reception points (TRPs).

Figure 2:
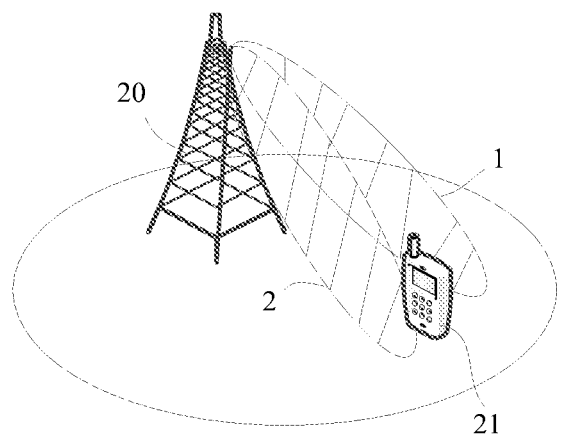
FIG. 2 is a schematic diagram showing that a base station transmits the same DCI to a terminal through two beams respectively in an embodiment of the present disclosure.
Figure 3:
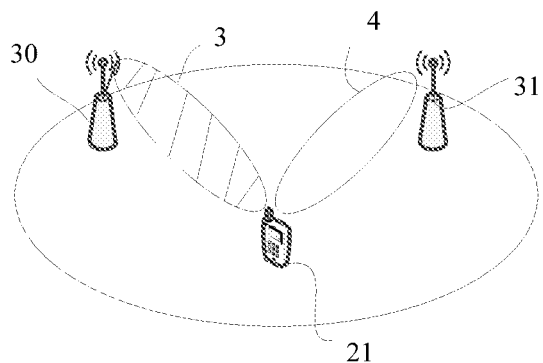
FIG. 3 is a schematic diagram showing that a terminal simultaneously receives different data carried on beams of two TRPs in an embodiment of the present disclosure.

In some embodiments, the base station needs to transmit the same DCI on different beams to enhance the reliability of the downlink control channel. As shown in FIG. 2, a base station 20 transmits the same DCI to a terminal 21 on beam 1 and beam 2 respectively. As shown in FIG. 3, the terminal 21 needs to simultaneously receive data carried on beam 3 from TRP 30 and data carried on beam 4 from TRP 31, where the data carried on beam 3 of TRP 30 and the data carried on beam 4 of TRP 31 are different.

For the scene shown in FIG. 2, after successfully receiving the required DCI, the terminal 21 is not required to continue to perform a blind detection on PDCCH in at least one CORESET in the monitoring occasion according to a specific DCI format; for the scene shown in FIG. 3, after successfully receiving the required DCI, the terminal 21 is still required to continue to perform a blind detection on PDCCH in at least one CORESET in the monitoring occasion according to a specific DCI format.

In some embodiments, the blind detection indication information carried in the first DCI received by the terminal is indicated by a 1-bit information domain. It is assumed that a base station configures two CORESETs for a terminal in a monitoring occasion of each downlink control channel. Different CORESETs correspond to different beam directions or one CORESET corresponds to different beam directions.

Therefore, when the blind detection indication information is in the first status, the terminal does not continue to detect the downlink control channel in the same CORESET or other CORESETs according to a specified DCI format, after one DCI with the specific DCI format carried by the downlink control channel is successfully detected and received according to the specified DCI format in one CORESET in a monitoring occasion of the downlink control channel. For example, when the terminal successfully receives the DCI with the specific DCI format in CORESET 1, the terminal is not required to continue to monitor the downlink control channel according to the specific DCI format in CORESET 1 and CORESET 2.

When the blind detection indication information is in the second status, the terminal is required to continue to detect and receive a downlink control channel in a CORESET or other CORESETs according to a specific DCI format after the DCI with the specific DCI format carried by the downlink control channel is successfully received according to the specific DCI format in one COREST in a monitoring occasion of the downlink control channel. For example, when the terminal successfully receives the DCI with the specific DCI format in CORESET 1, the terminal is required to continue to monitor the downlink control channel according to the specific DCI format in CORESET 1 and CORESET 2 until all downlink control channel candidate locations (PDCCH candidate locations) in two CORESETs finish detection or achieve an upper limit of the blind detection.

Alternatively, if the terminal may simultaneously receive data information on two beams at most, when the blind detection indication information is in the second status, the base station does not continue to perform a blind detection on the downlink control channel according to the specific DCI format in all CORESETs in the monitoring occasion of the downlink control channel after two DCI with the specific DCI format are successfully received. Of course, the terminal is also possibly required to receive data information transmitted on a plurality of beams.

It is assumed that a base station configures a plurality of CORESETs for a terminal in a monitoring occasion of each downlink control channel, where different CORESETs correspond to different beam directions or one CORESET corresponds to different beam directions. The base station may carry the blind detection indication information in the DCI. When the blind detection indication information is indicated by an 2-bit information domain, as shown in Table 1, different combinations of the blind detection indication information may indicate different blind detection strategies.

TABLE 1

| Blind detection indication information | The number of DCI with the same DCI format and desired to be received |
|---|---|
| 00 | 1 |
| 01 | 2 |
| 10 | 3 |
| 11 | 4 |

In Table 1, when the combination of the blind detection indication information is 00, the blind detection indication information is in the first status; and when the combination of the blind detection indication information is 01 or 10 or 11, the blind detection indication information is in the second status.

In some embodiments, when the blind detection indication information is 00, the terminal does not continue to detect the downlink control channel in the same CORESET or other CORESETs according to a specific DCI format after one DCI with the specified DCI format carried by the downlink control channel is successfully detected and received according to the specified DCI format in one CORESET in a monitoring occasion of the downlink control channel.

When the blind detection indication information is 01, the terminal is required to continue to perform a blind detection on the downlink control channel in the CORESET or other CORESETs according to the specific DCI format after one DCI with the specified DCI format carried by the downlink control channel is successfully detected and received according to the specified DCI format in one CORESET in a monitoring occasion of the downlink control channel until successful detection of another DCI with the same specified DCI format as the previous to finish the blind detection of the search space.

When the blind detection indication information is 10, the terminal is required to continue to perform the blind detection on the downlink control channel according to the same DCI format in the CORESET or other CORESETs after one DCI in the DCI carried by the downlink control channel is successfully detected and received according to the specific DCI format in one CORESET in the monitoring occasion of the downlink control channel until successful detection of another DCI with two specific DCI formats or completion of the blind detection of the search space.

When the blind detection indication information is 11, the terminal is required to continue to perform the blind detection on the downlink control channel according to the same DCI format in the CORESET or other CORESETs after one DCI in the DCI carried by the downlink control channel is successfully detected and received according to the specific DCI format in one CORESET in the monitoring occasion of the downlink control channel until successful detection of another DCI with three same specific DCI formats or completion of the blind detection of the search space.

Of course, in some embodiments, the number of DCI with the same DCI format desired to be received by the terminal may be smaller than 4. For example, when the number of the DCI with the same DCI format desired to be received by the terminal is 3, 11 may be reserved.

Optionally, the terminal determines whether to continue to detect the downlink control channel based on the first DCI may be performed through, but not limited to the following two manners.

(a) The terminal determines a first radio network temporary identity (RNTI) used for scrambling a cyclic redundancy check (CRC) of the first DCI, and then, the terminal determines whether to continue to detect the downlink control channel according to the same DCI format in the same monitoring occasion based on the first RNTI.

That is, the terminal may determine whether to continue to detect the downlink control channel based on the RNTI used by the base station for scrambling the CRC of the first DCI. The process may be: when the terminal determines that the first RNTI is an RNTI with a first number, the terminal does not continue to detect the downlink control channel, or when the terminal determines that the first RNTI is an RNTI with a second number, the terminal continues to detect the downlink control channel to acquire second DCI.

In some embodiments, the base station may scramble the CRC of the first DCI by using different RNTIs. For example, the base station may scramble the CRC by using an X-RNTI or the base station may scramble the CRC by using a Y-RNTI, where X in the X-RNTI and Y in the Y-RNTI correspond to different numbers. That is, the RNTI with different numbers may correspond to different scenes.

It is assumed that the first number of the first RNTI is X, the corresponding terminal is required to detect that the number of DCI acquired is 1 according to the specified DCI format in one CORESET in the monitoring occasion of the downlink control channel; when the second number of the first RNTI is Y, the corresponding terminal is required to detect that the number of DCI acquired is greater than 1 according to the specified DCI format in one CORESET in the monitoring occasion of the downlink control channel. Of course, the specific values of X and Y may be self-defined according to actual cases, but are not confined in the embodiments of the present disclosure.

Therefore, if the terminal determines that the first RNTI is an RNTI with the first number, the terminal does not continue to detect the downlink control channel in the same CORESET or other CORESETs according to the DCI format after one DCI with the specific DCI format carried by the downlink control channel is successfully detected and received according to the specific DCI format in one CORESET in the monitoring occasion of the downlink control channel; or if the terminal determines that the first RNTI is an RNTI with the second number, the terminal is required to continue to detect the downlink control channel in the same CORESET or other CORESETs according to the specific DCI format after one DCI with the specific DCI format carried by the downlink control channel is successfully detected and received according to the specific DCI format in one CORESET in the monitoring occasion of the downlink control channel.

It needs to be noted that the embodiment of the present disclosure may also introduce a plurality of RNTIs that have different numbers and correspond to different number of the DCI with the same DCI format to be received, which are not confined in the embodiment of the present disclosure.

(b) the terminal may determine the DCI format of the first DCI, and the terminal may determine whether to continue to detect the downlink control channel according to the same DCI format in the same monitoring occasion according to a DCI format set to which the DCI format of the first DCI belongs.

In some embodiments, the base station may configure DCI formats which belong to different DCI format sets for the terminal, and the terminal determines whether it is necessary to continue to perform a blind detection on the downlink control channel in the same CORESET or different CORESETs according to the same specific DCI format after one DCI with the specific DCI format carried by the downlink control channel is successfully detected and received in one CORESET in a monitoring occasion of the downlink control channel through the specific DCI format set to which the received DCI format set belongs.

For example, DCI format set 1 and DCI format set 2 are introduced, where DCI format set 1 includes at least one DCI format and DCI format set 2 also includes at least one DCI format. The base station may configure that the terminal corresponding to DCI format set 1 is required to detect that the number of DCI acquired is 1 according to the specific DCI format in one CORESET in the monitoring occasion of the downlink control channel, and the base station may configure that the terminal corresponding to DCI format set 2 is required to detect that the number of DCI acquired is greater than 1 according to the specific DCI format in one COREST in the monitoring occasion of the downlink control channel.

Therefore, when the DCI format of the first DCI received by the terminal belongs to DCI format set 1, the terminal does not continue to detect the downlink control channel in the same CORESET or other CORESETs according to the DCI format of the first DCI after first DCI carried by the downlink control channel is successfully detected and received according to the DCI format of the first DCI in one CORESET in a monitoring occasion of the downlink control channel.

Alternatively, when the DCI format of the first DCI received by the terminal belongs to DCI format set 2, the terminal is required to continue to detect the downlink control channel in the same CORESET or other CORESETs according to the DCI format of the first DCI after the first DCI carried by the downlink control channel is successfully detected and received according to the DCI format of the first DCI in one CORESET in a monitoring occasion of the downlink control channel.

Embodiment 2

Figure 4:
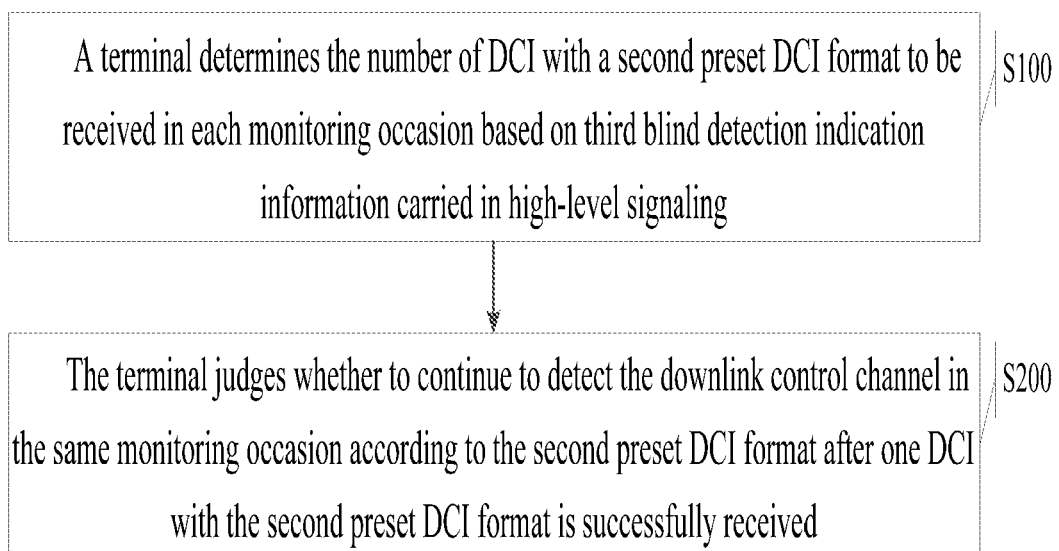
FIG. 4 is a schematic flow diagram showing a method for determining whether to continue to detect a downlink control channel provided in embodiment 2 in embodiments of the present disclosure.

Referring to FIG. 4, the embodiment of the present disclosure further provides a method for determining whether to continue to detect a downlink control channel. The processes of the method may be described as follows.

S100: the terminal determines the number of DCI with a second preset DCI format to be received in each monitoring occasion based on third blind detection indication information carried in higher layer signaling.

S200, the terminal judges whether to continue to detect the downlink control channel in the same monitoring occasion according to the second preset DCI format after one DCI with the second preset DCI format is successfully received.

In this method, the terminal knows the number of DCI with the DCI format to be received before performing a blind detection on the downlink control channel.

That is, the third blind detection indication information carried in the higher layer signaling of the terminal may indicate the number of the DCI with a first preset DCI format to be received by the terminal in one monitoring occasion, and the subsequent terminal may detect and receive the DCI on the downlink control channel according to the number of DCI with the first preset DCI format indicated by the third blind detection indication information.

The third blind detection indication information may be indicated by an M-bit information domain, where M is an integer greater than or equal to 1. Further, the third blind detection indication information may be divided into a third status and a fourth status according to the M-bit information domain.

The third status: it may be described as a status when the number of DCI with the same DCI format to be received by the terminal in one monitoring occasion is 1.

For example, if the third blind detection indication information is indicated by a 1-bit information domain, e.g., the third blind detection indication information may be 0, that is, the third blind detection indication information is in the third status, the number of DCI with the same DCI format to be received by the terminal in one monitoring occasion is 1; if the third blind detection indication information is indicated by an N>1-bit information domain, e. g., the third blind detection indication information is indicated by an N=2-bit information domain, the combination of the third blind detection indication information is 00, that is, the third blind detection indication information is in the third status, the number of DCI with the same DCI format to be received by the terminal in one monitoring occasion is 1.

The fourth status: it may be described as a status when the number of DCI with the same DCI format to be received by the terminal in one monitoring occasion is greater than 1.

For example, if the third blind detection indication information is indicated by a 1-bit information domain, e.g., the third blind detection indication information may be 1, that is, the third blind detection indication information is in the fourth status, the number of DCI with the same DCI format to be received by the terminal in one monitoring occasion is greater than 1; if the third blind detection indication information is indicated by an N>1-bit information domain, e. g., the blind detection indication information is indicated by an M=2-bit information domain, the combination of the third blind detection indication information may be 01 or 10 or 11, that is, the third blind detection indication information is in the fourth status, the number of DCI with the same DCI format to be received by the terminal in one monitoring occasion is greater than 1.

For example, the terminal may receive the third blind detection indication information in the RRC signaling. It is assumed that when the third blind detection indication information is indicated by an M=1-bit information domain, the third blind detection indication information is in the third status, e.g. the third blind detection indication information is 0, the terminal does not continue to detect the downlink control channel in the same CORESET or other CORESETs according to the same DCI format after one DCI carried by the downlink control channel is successfully detected and received according to the DCI format indicated by the third blind detection indication information in one CORESET in a monitoring occasion of the downlink control channel.

When the third blind detection indication information is in the fourth status, e.g., the third blind detection indication information is 1, the terminal continues to detect and receive the downlink control channel in the same CORESET or other CORESETs according to the same DCI format after one DCI carried by the downlink control channel is successfully detected and received according to the DCI format indicated by the third blind detection indication in one CORESET in a monitoring occasion of the downlink control channel.

When the third blind detection indication information is indicated by an M>1-bit information domain, e.g., the third bind test indication information is indicated by an M=2-bit information domain, different information bit combinations, e.g., a corresponding method in Embodiment 1 is not described in the embodiment of the present disclosure. That is, the terminal may perform the blind detection on the downlink control channel according to the third blind detection indication information carried in the above higher layer signaling in an RRC signaling configuration cycle.

Embodiment 3

Based on the same inventive concept, the embodiment of the present disclosure further provides a method for determining whether to continue to detect a downlink control channel, which is applied to a base station and includes that: the base station transmits first DCI to a terminal to cause the terminal to determine whether to continue to detect the downlink control channel based on the first DCI after acquiring the first DCI.

Optionally, if the base station transmits the first DCI to the terminal through a common downlink control channel or a group common downlink control channel, at least one blind detection indication information is carried in the first DCI, where each of the at least one blind detection indication information indicates the number of DCI with a preset DCI format of a corresponding terminal to be received within a UE-specific search space in one monitoring occasion.

Optionally, if the base station transmits the first DCI to the terminal through a UE-specific downlink control channel, second blind detection indication information is carried in the first DCI, and the second blind detection indication information indicates the number of DCI with the same DCI format as the first DCI to be received by the terminal in the same monitoring occasion of the downlink control channel.

Optionally, before the base station transmits the first DCI to the terminal, the method includes that: the base station carries each of the at least one blind detection indication information or the second blind detection indication information in an N-bit information domain of the first DCI; where N is an integer greater than or equal to 1, each of the at least one blind detection indication information or the second blind detection indication information includes a first status and a second status, where the first status is a status indicated by the base station when the number of DCI with the same DCI format to be received by the terminal in one monitoring occasion is 1, and the second status is a status indicated by the base station when the number of DCI with the same DCI format to be received by the terminal in one monitoring occasion is greater than 1.

Optionally, the N-bit information domain serves as a first information domain or a second information domain or a third information domain of the first DCI.

Optionally, the monitoring occasion is a continuous time-domain resource of the downlink control channel to be monitored by the terminal in a TTI.

Optionally, before the base station transmits the first DCI to the terminal, the method further includes that: the base station scrambles a cyclic redundancy check (CRC) of the first DCI based on a first RNTI, where the first RNTI is an RNTI with a first number or an RNTI with a second number; and when the first RNTI is the RNTI with the first number, the base station indicates the terminal not to continue to detect the downlink control channel, or when the first RNTI is the RNTI with the second number, the base station indicates the terminal to continue to detect the downlink control channel.

Optionally, before the base station transmits the first DCI to the terminal, the method includes that: the base station transmits first DCI for the terminal by using different DCI formats which belong to different DCI format sets, where each of the DCI format sets corresponds to whether the terminal continues to detect the downlink control channel or the terminal does not continue to detect the downlink control channel.

Embodiment 4

The embodiment of the present disclosure provides a method for determining whether to continue to detect a downlink control channel, which is applied to a base station. The process of the method may be described as follows: the base station transmits higher layer signaling to the terminal, where the higher layer signaling includes third blind detection indication information, the third blind detection indication information indicates the number of DCI with a second preset DCI format to be received by the terminal in each monitoring occasion.

Optionally, before the base station transmits the higher layer signaling to the terminal, the method includes that: the base station carries the third blind detection indication information in an M-bit information domain of the higher layer signaling; where M is an integer greater than or equal to 1, the third blind detection indication information includes a third status and a fourth status, the third status is a status when the number of DCI with the same DCI format to be received by the terminal in one monitoring occasion is 1, and the fourth status is a status when the number of DCI with the same DCI format to be received by the terminal in one monitoring occasion is greater than 1.

Embodiment 5

Figure 5:
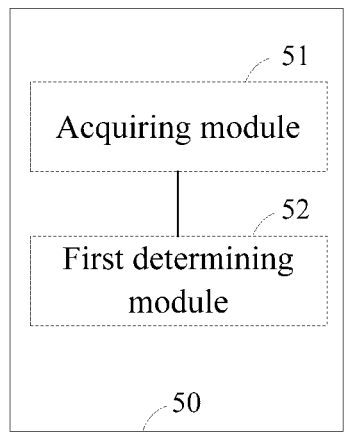
FIG. 5 is a schematic modular diagram showing a terminal corresponding to embodiment 1 in embodiments of the present disclosure.

Referring to FIG. 5, based on the same inventive concept, the embodiment of the present disclosure provides a terminal 50, the terminal 50 includes an acquiring module 51 and a first determining module 52.

The acquiring module 51 is used for acquiring first DCI, and the first determining module 52 is used for determining whether to continue to detect a downlink control channel based on the first DCI.

Optionally, if the acquiring module 51 acquires the first DCI from a common downlink control channel or a group common downlink control channel, the first determining module 52 is used for: determining first blind detection indication information corresponding to the terminal among at least one blind detection indication information carried in the first DCI, where the first blind detection indication information indicates the number of DCI to be received by the terminal based on a second preset DCI format within a UE-specific search space in one monitoring occasion; and determining whether to continue to detect the downlink control channel according to the second preset DCI format in the same monitoring occasion based on the first blind detection indication information, after one DCI is successfully received according to the second preset DCI format within a UE-specific search space in one monitoring occasion.

Optionally, if the acquiring module 51 acquires the first DCI from a UE-specific downlink control channel, the first determining module 52 is used for: determining second blind detection indication information carried in the first DCI, where the second blind detection indication information indicates the number of DCI with the same DCI as the first DCI to be received by the terminal in the same monitoring occasion of the downlink control channel; and determining whether to continue to detect the downlink control channel according to DCI with the same DCI format as the first DCI in the same monitoring occasion based on the second blind detection indication information.

Optionally, the first blind detection indication information or the second blind detection indication information is indicated by an N-bit information domain, where N is an integer greater than or equal to 1; and the first determining module 52 is used for: when the first blind detection indication information or the second blind detection indication information is in the first status, determining not to continue to detect the downlink control channel, where the first status is a status when the number of DCI with the same DCI format to be received by the terminal in one monitoring occasion is 1; or when the first blind detection indication information or the second blind detection indication information is in the second status, determining to continue to detect the downlink control channel to acquire second DCI, where the second status is a status when the number of DCI with the same DCI format to be received by the terminal in one monitoring occasion is greater than 1.

Optionally, the N-bit information domain serves as a first information domain or a second information domain or a third information domain of the first DCI.

Optionally, the monitoring occasion is a continuous time-domain resource of the downlink control channel to be monitored by the terminal, and the terminal monitors the downlink control channel in at least one control resource set (CORESET) in the monitoring occasion.

Optionally, the first determining module 52 is used for: determining a first RNTI used for scrambling a cyclic redundancy check (CRC) of the first DCI; and determining whether to continue to detect the downlink control channel based on the first DCI.

Optionally, the first determining module 52 is specifically used for: if it is determined that the first RNTI is an RNTI with a first number, determining not to continue to detect the downlink control channel according to the same DCI format in the same monitoring occasion; or if it is determined that the first RNTI is an RNTI with a second number, determining to continue to detect the downlink control channel according to the same DCI format in the same monitoring occasion to acquire second DCI.

Optionally, the first determining module 52 is used for: determining a DCI format of the first DCI; and determining whether to continue to detect the downlink control channel according to the same DCI format in the same monitoring occasion based on a DCI format set to which the DCI format of the first DCI belongs.

Embodiment 6

Figure 6:
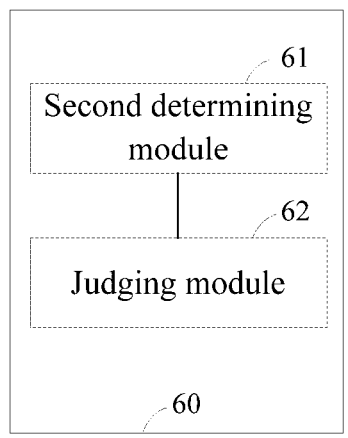
FIG. 6 is a schematic modular diagram showing a terminal corresponding to embodiment 2 in embodiments of the present disclosure.

Referring to FIG. 6, based on the same inventive concept, the embodiment of the present disclosure provides a terminal 60, the terminal 60 includes a second determining module 61 and a judging module 62.

The second determining module 61 is used for determining the number of DCI with a second preset DCI format to be received in each monitoring occasion based on third blind detection indication information carried in higher layer signaling.

The judging module 62 is used for judging whether to continue to detect the downlink control channel in the same monitoring occasion according to the second preset DCI format after one DCI with the second preset DCI format is successfully received.

Optionally, the third blind detection indication information is indicated by an M-bit information domain, where M is an integer greater than or equal to 1; and the second determining module 61 is used for: when the third blind detection indication information is in a third status, determining not to continue to detect the downlink control channel, where the third status is a status when the number of DCI with the same DCI format to be received by the terminal in one monitoring occasion is 1, or when the third blind detection indication information is in a fourth status, determining to continue to detect the downlink control channel, where the fourth status is a status when the number of DCI with the same DCI format to be received by the terminal in one monitoring occasion is greater than 1.

Embodiment 7

Figure 7:
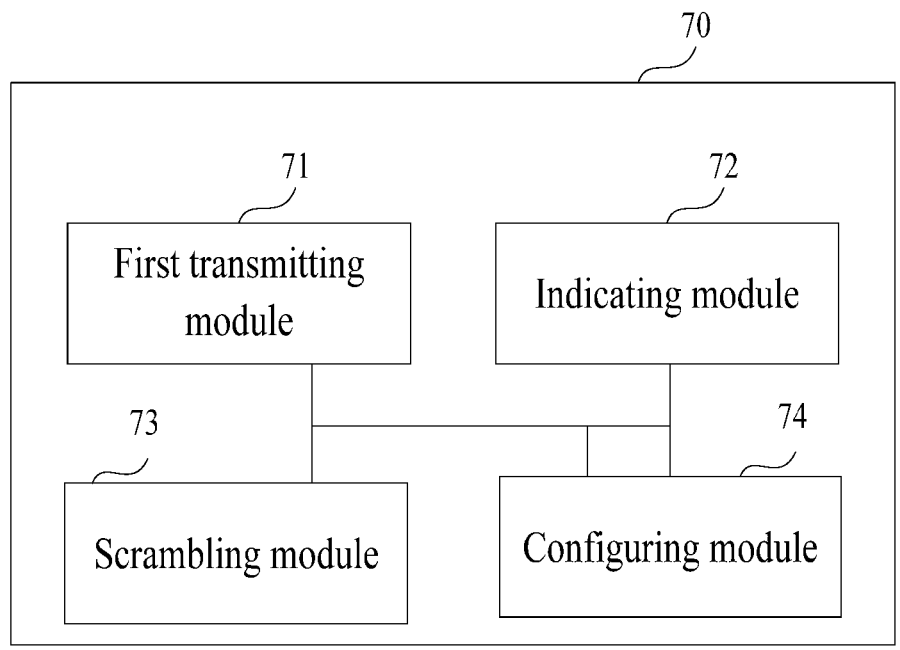
FIG. 7 is a schematic modular diagram showing a base station in an embodiment of the present disclosure.

Referring to FIG. 7, based on the same inventive concept, the embodiment of the present disclosure provides a base station 70, the base station 70 includes a first transmitting module 71, an indicating module 72, a scrambling module 73 and a configuring module 74.

The first transmitting module 71 is used for transmitting first DCI to a terminal to cause the terminal to determine whether to continue to detect a downlink control channel based on the first DCI after acquiring the first DCI.

Optionally, if the first transmitting module 71 transmits the first DCI to the terminal through a common downlink control channel or a group common downlink control channel, at least one blind detection indication information is carried in the first DCI, where each of the at least one blind detection indication information indicates the number of DCI with a preset DCI format of a corresponding terminal to be received within a UE-specific search space in one monitoring occasion.

Optionally, if the first transmitting module 71 transmits the first DCI to the terminal through a UE-specific downlink control channel, second blind detection indication information is carried in the first DCI, where the second blind detection indication information indicates the number of DCI with the same DCI format as the first DCI to be received by the terminal in the same monitoring occasion of the downlink control channel.

Optionally, the indicating module 72 is used for indicating each of the at least one blind detection indication information or the second blind detection indication information through an N-bit information domain, where N is an integer greater than or equal to 1; and based on the N-bit information domain, determining a first status and a second status of each of the at least one blind detection indication information or the second blind detection indication information, where the first status is a status indicated by the base station when the number of DCI with the same DCI format to be received by the terminal in one monitoring occasion is 1, and the second status is a status indicated by the base station when the number of DCI with the same DCI format to be received by the terminal in one monitoring occasion is greater than 1.

Optionally, the N-bit information domain serves as a first information domain or a second information domain or a third information domain of the first DCI.

Optionally, the scrambling module 73 is used for scrambling a cyclic redundancy check (CRC) of first DCI based on a first RNTI, where the first RNTI is an RNTI with a first number or an RNTI with a second number; and when the first RNTI is an RNTI with a first number, indicating the terminal not to continue to detect the downlink control channel, or when the first RNTI is an RNTI with a second number, indicating the terminal to continue to detect the downlink control channel.

Optionally, the configuring module 74 is used for transmitting first DCI for a terminal by using a DCI format which belongs to a different DCI format set, where each DCI format set corresponds to whether the terminal continues to detect the downlink control channel or the terminal does not continue to detect the downlink control channel.

Embodiment 8

Figure 8:
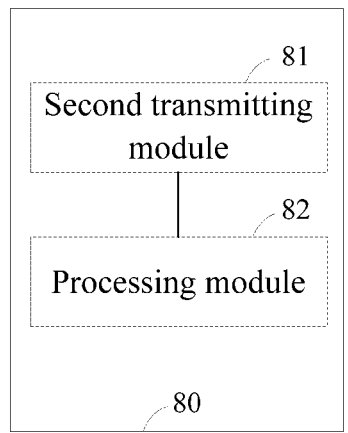
FIG. 8 is a schematic modular diagram showing another base station in an embodiment of the present disclosure.

Based on the same inventive concept, referring to FIG. 8, the embodiment of the present disclosure further provides a base station 80 including a second transmitting module 81 and a processing module 82.

The second transmitting module 81 is used for transmitting higher layer signaling to the terminal, the higher layer signaling includes third blind detection indication information, the third blind detection indication information is used for indicating the number of DCI with a second preset DCI format to be received by the terminal in each monitoring occasion.

The processing module 82 is used for carrying third blind detection indication information in an M-bit information domain of the higher layer signaling before the higher layer signaling is transmitted to the terminal.

M is an integer greater than or equal to 1, the third blind detection indication information includes a third status and a fourth status, the third status is a status when the number of DCI with the same DCI format to be received by the terminal in one monitoring occasion is 1, and the fourth status is a status when the number of DCI with the same DCI format to be received by the terminal in one monitoring occasion is greater than 1.

Embodiment 9

Figure 9:
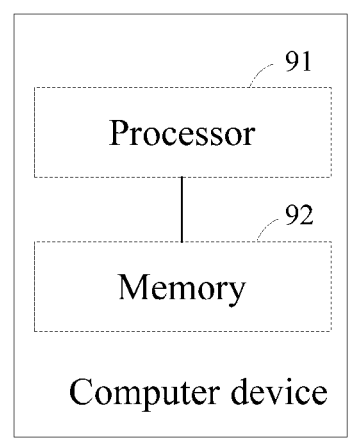
FIG. 9 is a schematic diagram showing a structure of a computer device in an embodiment of the present disclosure.

The embodiment of the present disclosure further provides a computer device. Referring to FIG. 9, the computer device includes a processor 91 and a memory 92. The processor 91 is used for realizing the processes of the method for determining whether to continue to detect a downlink control channel provided in the embodiments of the present disclosure when computer programs stored in the memory 92 is performed.

Optionally, the processor 91 may be a central processor and an application specific integrated circuit (ASIC), may be one or more integrated circuits for performing control programs, may be a hardware circuit developed by using a field programmable gate array (FPGA), or may be a baseband processor.

Optionally, the processor 91 may include at least one processing core.

Optionally, an electronic device further includes the memory 92 that may include a read only memory (ROM), a random access memory (RAM) and a magnetic disc memory. The memory 92 is used for storing data required for operation of the processor 91. The number of the memory 92 is one or more.

Embodiment 10

The embodiment of the present disclosure further provides a computer readable storage medium, the computer readable storage medium stores computer instructions that, when operating on a computer, may realize the operations of the method for determining whether to continue to detect a downlink control channel provided in the embodiments of the present disclosure.

In the embodiment of the present disclosure, it should be understood that the disclosed method for determining whether to continue to detect a downlink control channel, a terminal and a base station may be implemented through other manners. For example, the embodiments of the devices described above are merely illustrative. For example, division of units is merely a division of logic functions. Upon an actual realization, there may be an additional division manner. For example, a plurality of units or assemblies may be incorporated or integrated into another system or some features may be neglected or are not performed. As for another point, coupling between each other or direct coupling or communication connection displayed or discussed may be indirect coupling or communication connection of devices or units through some interfaces and may be in an electrical or other forms.

Each of the functional units in the embodiments of the present disclosure may be integrated into one processing unit or each of the units may also be an independent processing module.

If an integrated unit is implemented in a form of a software functional unit or sold or used as an independent product, the integrated unit may be stored in one computer readable storage medium. Based on such an understanding, the technical solutions of the embodiments of the present disclosure may be totally or partially reflected in a form of a software product. The computer software product is stored in a storage medium and includes a plurality of instructions for enabling one computer device, e.g. which may be a personal computer, a server, or a network device or enabling the processor to perform total or partial steps of the method in each embodiment of the present disclosure. The previous storage medium includes a universal serial bus flash drive (USB), a mobile disk, a read-only memory (ROM), a random access memory (RAM), a floppy disk or an optical disk and other various media that may store program codes.

The above embodiments are merely used for describing the technical solutions of the present disclosure in details, but the description of the above embodiments is only used for facilitating understanding the method in the embodiments of the present disclosure, but should not be understood as a restriction for the embodiments of the present disclosure. Variations or replacements that are easily conceivable for those skilled in the art should fall into the protection scope of the embodiments of the present disclosure.

The invention claimed is:

1. A method for determining whether to continue to detect a downlink control channel, applied to a terminal, comprising:
   acquiring, by the terminal, first downlink control information (DCI); and
   determining, by the terminal, whether to continue to detect a downlink control channel based on the first DCI;
   wherein said determining, by the terminal, whether to continue to detect the downlink control channel based on the first DCI comprises:
   determining, by the terminal, a first radio network temporary identity (RNTI) used for scrambling a cyclic redundancy check (CRC) of the first DCI; and
   determining, by the terminal, whether to continue to detect the downlink control channel based on the first RNTI; or
   wherein said determining, by the terminal, whether to continue to detect the downlink control channel based on the first DCI comprises:

determining, by the terminal, a DCI format of the first DCI; and determining, by the terminal, whether to continue to detect the downlink control channel based on a DCI format set to which the DCI format of the first DCI belongs.

2. The method according to claim 1, wherein, when the terminal acquires the first DCI from a common downlink control channel or a group common downlink control channel, the determining, by the terminal, whether to continue to detect the downlink control channel based on the first DCI comprises:

determining, by the terminal, first blind detection indication information corresponding to the terminal among at least one blind detection indication information carried in the first DCI, wherein the first blind detection indication information indicates the number of DCI to be received by the terminal based on a first preset DCI format within a UE-specific search space in one monitoring occasion; and after one DCI is successfully received by the terminal according to the first preset DCI format within the UE-specific search space in one monitoring occasion, determining, by the terminal, whether to continue to detect the downlink control channel according to the first preset DCI format in the same monitoring occasion based on the first blind detection indication information; or when the terminal acquires the first DCI from a UE-specific downlink control channel, the determining, by the terminal, whether to continue to detect the downlink control channel based on the first DCI comprises:

determining, by the terminal, second blind detection indication information carried in the first DCI, wherein the second blind detection indication information indicates the number of DCI with the same DCI format as the first DCI to be received by the terminal in the same monitoring occasion of the downlink control channel; and determining, by the terminal, whether to continue to detect the downlink control channel according to DCI with the same DCI format as the first DCI in the same monitoring occasion based on the second blind detection indication information.

3. The method according to claim 2, wherein, the first blind detection indication information or the second blind detection indication information is indicated by an N-bit information domain, wherein N is an integer greater than or equal to 1; and determining, by the terminal, whether to continue to detect the downlink control channel based on the first blind detection indication information or the second blind detection indication information comprises:

when the first blind detection indication information or the second blind detection indication information is in a first status, determining, by the terminal, not to continue to detect the downlink control channel, wherein the first status is a status when the number of DCI with the same DCI format to be received by the terminal in one monitoring occasion is 1;

when the first blind detection indication information or the second blind detection indication information is in a second status, determining, by the terminal, to continue to detect the downlink control channel, wherein the second status is a status when the number of DCI with the same DCI format to be received by the terminal in one monitoring occasion is greater than 1.

4. The method according to claim 3, wherein, the monitoring occasion is a continuous time-domain resource of the downlink control channel to be monitored by the terminal in one transmission time interval (TTI), and the terminal monitors the downlink control channel within at least one control resource set (CORESET) in the monitoring occasion.

5. The method according to claim 1, wherein, the determining, by the terminal, whether to continue to detect the downlink control channel based on the first RNTI comprises:

upon determining, by the terminal, that the first RNTI is an RNTI with a first number, determining, by the terminal, not to continue to detect the downlink control channel, or upon determining, by the terminal, that the first RNTI is an RNTI with a second number, determining, by the terminal, to continue to detect the downlink control channel.

6. A method for determining whether to continue to detect a downlink control channel, applied to a terminal, comprising:

determining, by the terminal, the number of downlink control information (DCI) with a second preset DCI format to be received in each monitoring occasion based on third blind detection indication information carried in higher layer signaling; and after one DCI with the second preset DCI format is successfully received, judging, by the terminal, whether to continue to detect a downlink control channel in a same monitoring occasion according to the second preset DCI format.

7. The method according to claim 6, wherein, the third blind detection indication information is indicated by an M-bit information domain, wherein M is an integer greater than or equal to 1; and the after one DCI with the second preset DCI format is successfully received, judging, by the terminal, whether to continue to detect the downlink control channel in the same monitoring occasion according to the first preset DCI format comprises:

when the third blind detection indication information is in a third status, determining, by the terminal, not to continue to detect the downlink control channel, wherein the third status is a status when the number of DCI with the same DCI format to be received by the terminal in one monitoring occasion is 1, or when the third blind detection indication information is in a fourth status, determining, by the terminal, to continue to detect the downlink control channel, wherein the fourth status is a status when the number of DCI with the same DCI format to be received by the terminal in one monitoring occasion is greater than 1.

8. A computer device, comprising a processor configured to, when computer programs stored in a memory is performed, realize the method of claim 6.

9. The computer device according to claim 8, wherein, the third blind detection indication information is indicated by an M-bit information domain, wherein M is an integer greater than or equal to 1; and the processor is further configured to:

when the third blind detection indication information is in a third status, determine not to continue to detect the downlink control channel, wherein the third status is a status when the number of DCI with the same DCI format to be received by the terminal in one monitoring occasion is 1, or when the third blind detection indication information is in a fourth status, determine to continue to detect the downlink control channel, wherein the fourth status is a status when the number of DCI with the same DCI format to be received by the terminal in one monitoring occasion is greater than 1.

10. A method for determining whether to continue to detect a downlink control channel, applied to a base station, comprising:
  transmitting, by the base station, first downlink control information (DCI) to a terminal to enable the terminal to determine whether to continue to detect a downlink control channel based on the first DCI after the terminal acquires the first DCI;
  wherein before the base station transmits the first DCI to the terminal, further comprising:
    scrambling, by the base station, a cyclic redundancy check (CRC) of the first DCI based on a first radio network temporary identity (RNTI), wherein the first RNTI is an RNTI with a first number or an RNTI with a second number; and
    when the first RNTI is the RNTI with the first number, indicating, by the base station, the terminal not to continue to detect the downlink control channel, or when the first RNTI is the RNTI with the second number, indicating, by the base station, the terminal to continue to detect the downlink control channel; or
  wherein before the base station transmits the first DCI to the terminal, further comprising:
    transmitting, by the base station, the first DCI for the terminal by using different DCI formats which belong to different DCI format sets, wherein each of the DCI format sets corresponds to whether the terminal continues to detect the downlink control channel or the terminal does not continue to detect the downlink control channel.

11. The method according to claim 10, wherein,
  when the base station transmits the first DCI to the terminal through a common downlink control channel or a group common downlink control channel, at least one blind detection indication information is carried in the first DCI, wherein each of the at least one blind detection indication information indicates the number of DCI with a preset DCI format of a corresponding terminal to be received within a UE-specific search space in one monitoring occasion; or
  when the base station transmits the first DCI to the terminal through a UE-specific downlink control channel, second blind detection indication information is carried in the first DCI, wherein the second blind detection indication information indicates the number of DCI with the same DCI format as the first DCI to be received by the terminal in a same monitoring occasion of the downlink control channel.

12. The method according to claim 11, before the base station transmits the first DCI to the terminal, comprising:
  carrying, by the base station, each of the at least one blind detection indication information or the second blind detection indication information in an N-bit information domain of the first DCI;
  wherein N is an integer greater than or equal to 1, each of the at least one blind detection indication information or the second blind detection indication information comprises a first status and a second status, the first status is a status indicated by the base station when the number of DCI with the same DCI format to be received by the terminal in one monitoring occasion is 1, and the second status is a status indicated by the base station when the number of DCI with the same DCI format to be received by the terminal in one monitoring occasion is greater than 1.

13. The method according to claim 12, wherein, the monitoring occasion is a continuous time-domain resource of the downlink control channel to be monitored by the terminal in one transmission time interval (TTI).

14. A computer device, comprising a processor, the processor configured to, when computer programs stored in a memory is performed, realize the method of claim 10.

15. The computer device according to claim 14, wherein,
  when the computer device transmits first DCI to the terminal through a common downlink control channel or a group common downlink control channel, at least one blind detection indication information is carried in the first DCI, wherein each of the at least one blind detection indication information indicates the number of DCI with a preset DCI format of a corresponding terminal to be received within a UE-specific search space in one monitoring occasion; or
  when the computer device transmits the first DCI to the terminal through a UE-specific downlink control channel, second blind detection indication information is carried in the first DCI, and the second blind detection indication information indicates the number of DCI with the same DCI format as the first DCI to be received by the terminal in a same monitoring occasion of a downlink control channel.

16. The computer device according to claim 15, wherein, the processor is further configured to:
  carry each of the at least one blind detection indication information or the second blind detection indication information in an N-bit information domain of the first DCI before first DCI is transmitted to the terminal;
  wherein N is an integer greater than or equal to 1, each of the at least one blind detection indication information or the second blind detection indication information comprises a first status and a second status, the first status is a status indicated by the base station when the number of DCI with the same DCI format to be received by the terminal in one monitoring occasion is 1, and the second status is a status indicated by the base station when the number of DCI with the same DCI format to be received by the terminal in one monitoring occasion is greater than 1.

17. The computer device according to 16, wherein the monitoring occasion is a continuous time-domain resource of the downlink control channel to be monitored by the terminal in one transmission time interval (TTI).

18. A method for determining whether to continue to detect a downlink control channel, applied to a base station, comprising:
  transmitting, by the base station, higher layer signaling to a terminal, wherein the higher layer signaling comprises third blind detection indication information, and the third blind detection indication information indicates the number of downlink control information (DCI) with a second preset DCI format to be received by the terminal in each monitoring occasion.

19. The method according to claim 18, before the transmitting, by the base station, the higher layer signaling to the terminal, comprising:
  carrying, by the base station, the third blind detection indication information in an M-bit information domain of the higher layer signaling;
  wherein M is an integer greater than or equal to 1, the third blind detection indication information comprises a third status and a fourth status, wherein the third status is a status when the number of DCI with the same DCI format to be received by the terminal in one monitoring occasion is 1, and the fourth status is a status when the number of DCI with the same DCI format to be received by the terminal in one monitoring occasion is greater than 1.

20. A computer device, comprising a processor, wherein the processor is configured to execute computer programs stored in a memory to perform the method of claim 1.

21. The computer device according to claim 20, wherein, when the computer device acquires the first DCI from a common downlink control channel or a group common downlink control channel, the processor is further configured to:
   determine first blind detection indication information corresponding to the terminal among at least one blind detection indication information carried in the first DCI, wherein the first blind detection indication information indicates the number of DCI to be received by the terminal based on a first preset DCI format within a UE-specific search space in one monitoring occasion; and
   determine whether to continue to detect the downlink control channel according to the first preset DCI format in the same monitoring occasion based on the first blind detection indication information after one DCI is successfully received according to the first preset DCI format within the UE-specific search space in one monitoring occasion; or
   when the computer device acquires the first DCI from a UE-specific downlink control channel, the processor is further configured to:
   determine second blind detection indication information carried in the first DCI, wherein the second blind detection indication information indicates the number of DCI with the same DCI format as the first DCI to be received by the terminal in the same monitoring occasion of the downlink control channel; and
   determine whether to continue to detect the downlink control channel according to DCI with the same DCI format as the first DCI in the same monitoring occasion based on the second blind detection indication information.

22. The computer device according to claim 21, wherein, the first blind detection indication information or the second blind detection indication information is indicated by an N-bit information domain, wherein N is an integer greater than or equal to 1; and the processor is further configured to:
   when the first blind detection indication information or the second blind detection indication information is in a first status, determine not to continue to detect the downlink control channel, wherein the first status is a status when the number of DCI with the same DCI format to be received by the terminal in one monitoring occasion is 1;
   when the first blind detection indication information or the second blind detection indication information is in a second status, determine to continue to detect the downlink control channel, wherein the second status is a status when the number of DCI with the same DCI format to be received by the terminal in one monitoring occasion is greater than 1.

23. The computer device according to claim 22, wherein, the monitoring occasion is a continuous time-domain resource of the downlink control channel to be monitored by the computer device in one transmission time interval (TTI), wherein the computer device monitors the downlink control channel within at least one control resource set (CORESET) in the monitoring occasion.

24. The computer device according to claim 20, wherein, the processor is further configured to:
   determine not to continue to detect the downlink control channel, upon determining that the first RNTI is an RNTI with a first number, or
   determine to continue to detect the downlink control channel, upon determining that the first RNTI is an RNTI with a second number.

25. A computer device, comprising a processor configured to, when computer programs stored in a memory is performed, realize the method of claim 18.

26. The computer device according to claim 25, wherein, the processor is further configured to:
   carry the third blind detection indication information in an M-bit information domain of the higher layer signaling before the higher layer signaling is transmitted to the terminal;
   wherein M is an integer greater than or equal to 1, the third blind detection indication information comprises a third status and a fourth status, wherein the third status is a status when the number of DCI with the same DCI format to be received by the terminal in one monitoring occasion is 1, and the fourth status is a status when the number of DCI with the same DCI format to be received by the terminal in one monitoring occasion is greater than 1.

* * * * *